United States Patent
Burka et al.

(10) Patent No.: US 7,765,527 B2
(45) Date of Patent: Jul. 27, 2010

(54) PER THREAD BUFFERING FOR STORING PROFILING DATA

(75) Inventors: Peter W. Burka, Ottawa (CA); Derek B. Inglis, Markham (CA); Nikola Grcevski, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1336 days.

(21) Appl. No.: 11/239,506

(22) Filed: Sep. 29, 2005

(65) Prior Publication Data

US 2007/0074171 A1  Mar. 29, 2007

(51) Int. Cl.
G06F 9/44 (2006.01)
(52) U.S. Cl. .................... 717/130; 717/128; 717/131; 717/139; 717/140
(58) Field of Classification Search ................. 717/128, 717/130, 131, 139, 140
See application file for complete search history.

(56) References Cited

U.S. PATENT DOCUMENTS

| | | | |
|---|---|---|---|
| 5,796,939 A * | 8/1998 | Berc et al. ............. 714/47 |
| 6,546,548 B1 * | 4/2003 | Berry et al. .......... 717/128 |
| 6,615,370 B1 * | 9/2003 | Edwards et al. ....... 714/45 |
| 6,694,507 B2 * | 2/2004 | Arnold et al. ........ 717/108 |
| 7,107,585 B2 * | 9/2006 | Berent et al. ........ 717/154 |
| 7,266,813 B2 * | 9/2007 | Nistler et al. ........ 717/141 |

OTHER PUBLICATIONS

Han Bok Lee and Benjamin G. Zorn "BIT: A Tool for Instrumenting Java Bytecodes" Dec. 1997, USENIX, p. 1-11.*
Conte et al. "Accurate and Practical Profile-Driven Compilation Using the Profile Buffer", IEEE, 1996, pp. 36-45.*

* cited by examiner

Primary Examiner—Wei Y Zhen
Assistant Examiner—Phillip H Nguyen
(74) Attorney, Agent, or Firm—Yee & Associates, P.C.; Libby Z. Toub

(57) ABSTRACT

A method, system and computer program product for collecting profiling information during runtime of a multithreaded program. According to the method, a plurality of instructions of the program for execution in an application thread are first received; a plurality of variable size profiling records are then stored in a buffer assigned exclusively to the application thread during execution of the plurality of instructions; and the plurality of profiling records in the buffer are then processed. The program may be written in Java bytecode for execution in a Java virtual machine with the processing of profiling buffers performed by a component of a JIT compiler for insertion into a repository in internal JIT format, e.g. a hash table, for later optimization processing.

19 Claims, 4 Drawing Sheets

| | |
|---|---|
| 510 | BufPtr = buffer |
| 520 | While not EOF(buffer) |
| 530 | PC = read (buffer, word size); |
| 540 | OpCode = getOpCodeType (PC); |
| 550 | DataSize = getOpCodeDataSize (OpCode) |
| 560 | Data = read (buffer, DataSize); |
| 570 | addProfileData(PC, Data); |
| 580 | End While |

Figure 5

PER THREAD BUFFERING FOR STORING PROFILING DATA

FIELD OF THE INVENTION

The present invention generally relates to the field of optimizing computer program execution. More specifically, to a method, system and computer program product for collecting profiling information during runtime of a multithreaded program.

BACKGROUND

In order to execute computer software written in a high level language, there are two generally accepted means. The source code may be first compiled by using a compiler into the object code (machine executable instructions) which can then be executed on a specific hardware (or simulated hardware) platform. Examples of computer language which typically involve compilation are C or C++ and Fortran. Alternatively, the source code may be read by an interpreter, one line at a time, which directly causes the underlying hardware platform to carry out the instructions. LISP is one example of an interpreted computer language.

Some other computer program languages may be subject to a hybrid approach for achieving portability and performance. For example, Java™ has gained popularity as a computer language for producing "write once, run anywhere" software, in addition to its object oriented nature. (Java is a trademark of Sun Microsystems, Inc. in the United States, other countries, or both.) Java source code is first compiled into bytecode, an intermediate representation of the software, on any platform. This bytecode can then be taken to another platform for execution. At the second platform, Java byte-code is interpreted by a Java virtual machine (JVM), which supports Java components on the platform with basic Java functionality. The interpretation process causes execution of the program to be slow. What has become widely available to improve the performance of Java code execution is to use a Java Just-in-Time compiler (JIT compiler). This compiler will then convert bytecode into native code which can be immediately executed on the platform. The term JIT is also used to describe any runtime compiler in a virtual machine, even if it is used selectively to compile some Java class methods while others are interpreted (see later).

Virtual machines (VM), such as the Java virtual machine, execute the program code (bytecode) dynamically and typically incorporate both an interpreter and an optimizing JIT compiler to speed-up the program execution. When the JIT compiler is included in the VM package it starts optimizing the "hot" program code, that is, the program code that executed some given number of times. If an interpreter is present in the VM package it usually is the first component that starts executing the program code, and if the code is "hot" enough it invokes the JIT compiler to compile the executing method (segment of the program code, also denoted in this document as "code method"). Once a segment of the program code is compiled, the VM uses the compiled version to speed-up program execution.

The interpreter is slower executing the code than a JIT compiled version of the same code, but it doesn't need time to compile and optimize the bytecode. Therefore, running the interpreter and JIT for compiling code involves a tradeoff in performance, i.e. for methods that execute infrequently it is more efficient to interpret, since the compilation overhead is higher than the gains obtainable from better optimized code. On the other hand, for methods that run frequently the JIT compiler should be employed, and thereby results in gain on performance in the long run. The definition of "hot" code, that is, code that is frequently executed is dependent on the VM implementation.

In general a typical VM, containing both a JIT compiler and an interpreter, runs in a mixed mode execution environment. For each piece of code that is executing, the VM knows whether the code is compiled (previously JIT compiled) or in raw bytecode format. When the code is called to be executed, the VM decides what to invoke, e.g. call the JIT compiled binary version of the code or call the interpreter component to process the raw bytecode.

The optimizing JIT compiler performs a number of different optimizations on the program code which heavily depend on the amount of time the JIT compiler is allotted to spend optimizing the code. In general the more the optimizing compiler knows about the program execution, the better code it can produce. For example, if the compiler knows the internal program execution flow, which conditional branches were taken and which weren't, it could lay out the code so that the most common flow path is favored. The code layout is usually very important for maximal program execution performance, reducing the CPU branch mis-prediction rate and improving the CPU instruction cache locality.

Since the "hot" code segments are usually compiled almost immediately after the program starts executing, the performance of the interpreter component of the VM becomes less important. Therefore, a moderate slowdown in interpreter performance is acceptable if it results in superior performance in JIT compiled code. In particular, the interpreter component can be modified to collect some information about the program execution. This information will later be used by the JIT compiler to produce better code and better performing program in the long run. This process, called profiling, selects a set of inputs for a program, executes the program with these inputs, and records the run-time behavior of the program. By carefully selecting inputs, one can derive accurate estimate of program run-time behavior with profiling.

One of the biggest challenges VM designers face when designing profiling frameworks is how to efficiently collect and use the profiling data so as to not affect application performance. For example, if the interpreter took a long time to collect the profiling information, or if it took a long time to process the interpreter collected data, the initial start-up performance of the application would be severely impeded. Another important aspect of the data collection process is the memory footprint overhead: the data collected by the profiler could take up a significant amount of memory. On the other hand, having more profiling information and more precise information is the key to better code and better run-time execution performance.

Many of the present dynamic or static profiling frameworks are collecting only one type of information, restricting the profiling on branches and calls. This is usually an artifact of their implementation and it is hard to change the framework to collect more complex dataset of information. It would be advantageous to collect arbitrary profiling data about the program execution.

SUMMARY OF THE INVENTION

This invention provides a method, system and computer program product for collecting profiling information during runtime of a multithreaded program. According to the invention there is provided a method for collecting profiling information during runtime of a multithreaded program comprising the steps of: receiving a plurality of instructions of the program for execution in an application thread; storing a plurality of profiling records in a buffer assigned exclusively to the application thread during execution of the plurality of instructions; processing the plurality of profiling records in the buffer using a compiler.

Each profiling record may be of a variable size and/or stored in the buffer for each of the plurality of instructions.

The application thread may post a buffer full event when the buffer is filled with the plurality of profiling records, the buffer full event being listened for by a component of the compiler for commencing processing the buffer.

The application thread may be one of a plurality of execution threads and the compiler may run in a separate thread.

The step of processing the buffer may include the step of reproducing a copy of the buffer and/or includes resetting the buffer for the application thread to insert additional profiling records into the buffer.

In a variation, each instruction is a Java bytecode; and each profiling record comprises a first record field containing a program counter and a second record field containing profiling data, and the second record field being of a variable size.

In a further variation, the step of processing the buffer comprises storing and/or aggregating for each profiling record its corresponding profiling data in a hash table using its corresponding program counter as a hash key.

The profiling data of each profiling record may comprise operand data selected from the group consisting of: an indicator for "branch taken" or "branch not taken" for conditional branches; the operand for multi-target branches; the receiver class for virtual sends; and the operand class for cast bytecodes.

The method may further comprise the step of monitoring by a controller thread for determining whether bytecode profiling should be turned on or off.

BRIEF DESCRIPTION OF THE DRAWINGS

These and other features of this invention will be more readily understood from the following detailed description of the various aspects of the invention taken in conjunction with the accompanying drawings in which like numbers denote like parts.

DETAILED DESCRIPTION OF THE INVENTION

Figure 1:
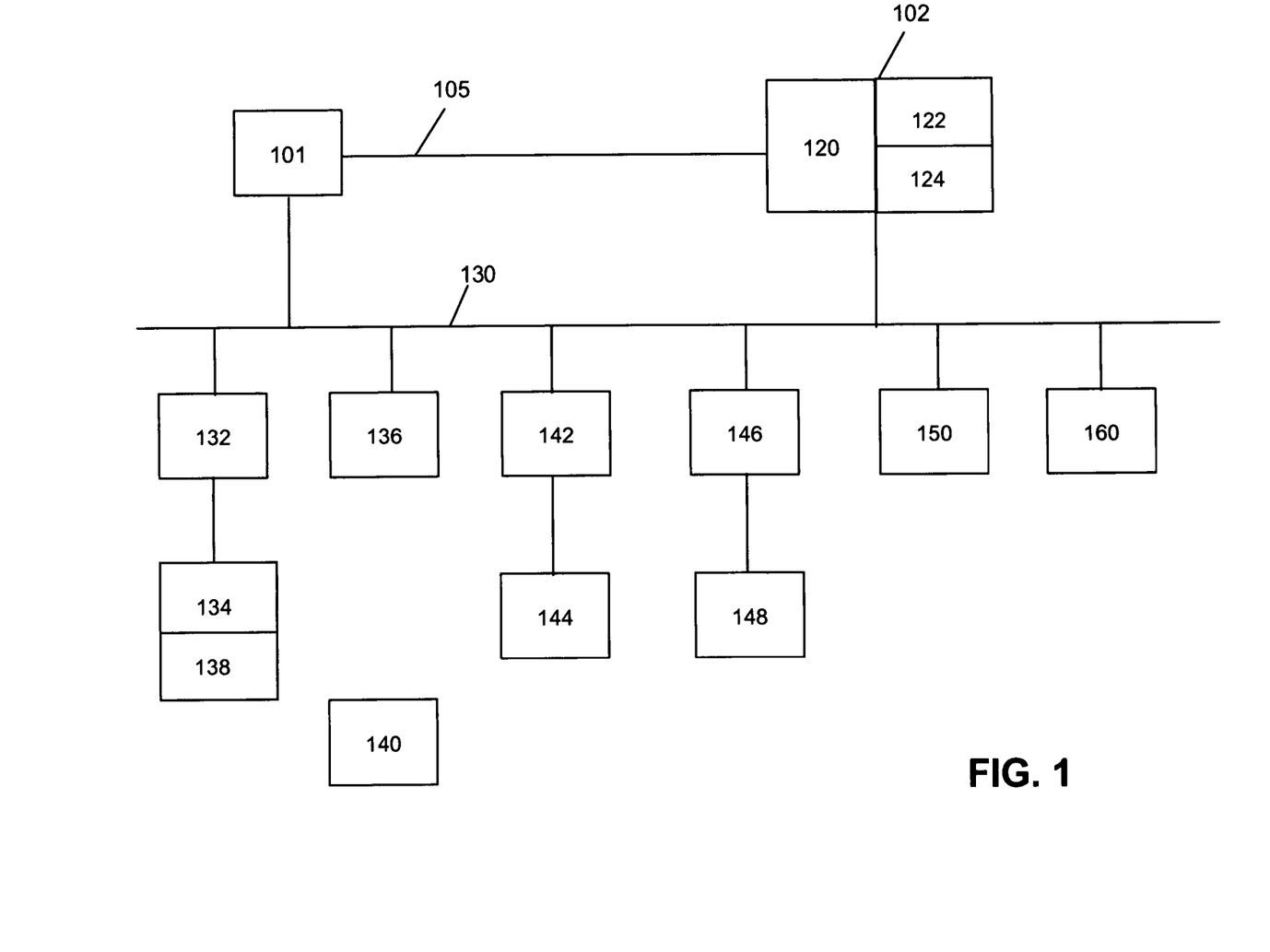
FIG. 1 depicts a system in which the present invention may be implemented.

With reference now to the figures, and in particular with reference to FIG. 1, a pictorial representation of a system in which the present invention may be implemented is depicted. Computer system 100 may comprise central processing unit (CPU) 101 which may be a programmable processor, executing instructions stored in memory 102. While a single CPU is shown in FIG. 1, computer systems having multiple CPUs may also be used. Memory 102 is connected to the CPU 101 through an internal bus 105 and/or an external system bus 130. Memory 102 may be a random-access semiconductor memory for storing data and programs; memory is shown conceptually as a single entity but memory may be arranged in a hierarchy of caches and other memory devices. Residing in memory 102 are Operating system 120 and applications 122. Operating system 120 provides, amongst others, functions such as device interfaces, management of memory pages, management of multiple tasks, etc. CPU 101 is suitably programmed to execute the operating system 120 and instructions of applications 122 retrieved from memory 102. Memory 102 has the necessary elements to carry out the preferred embodiment by having a JIT compiler 204 (see FIG. 2) as part of a virtual machine 124. Applications 122 may include legacy applications and if it includes a server software application, network interface 108 may interact with the server software application 122 to enable computer system 100 to be a network server.

Communication bus 130 supports transfer of data, commands and other information between different devices; while shown in simplified form as a single bus, it may be structured as multiple buses, and may be arranged in a hierarchical form. Display adapter 132 supports video display 134. Keyboard/pointer adapter 136 supports keyboard 138 and pointing device 140 depicted as a mouse (other forms of input devices could be used). Storage adapter 142 supports one or more data storage devices 144 which may be rotating magnetic hard disk drives, CD-ROM drives, or other data storage devices. Printer adapter 146 supports printer 148. Adapter 150 may connect a wide variety of peripheral devices to the computer system 100 and to other adapters connected to other devices such as, but not limited to, speakers, audio and visual equipment, tape drives, optical drives, printers, disk controllers, other bus adapters, PCI adapters, and workstations using one or more protocols known in the art. Network interface 160 provides a physical interface to a network, such as the Internet. This interface may comprise a modem connected to a telephone line through which an Internet access provider or online service provider is reached. For example, computer system 100 may be connected to another network server via a local area network using an Ethernet, Token Ring, or other protocol, the second network server in turn being connected to the Internet. Alternatively, network interface 160 may be provided through cable television, fiber optics, satellites, wireless, or other connections. The representation of FIG. 1 is intended as an exemplary simplified representation, it being understood that in other computer systems 100 many variations in system configuration are possible in addition to those mentioned here.

Finally, computer system 100 need not be a computer at all, but may be a simpler appliance-like client device, also called an embedded device, having less processing power and memory such as a network terminal, a thin client, terminal-like devices, a voice response unit, etc. A variety of pervasive mobile devices as clients may be used. Mobile architecture enables the multitude of clients including laptops, sub-notebooks, handheld computers such as personal digital assistants and companion devices, and mobile appliances such as smartphones, pagers, simple messaging devices and wearable devices. When the computer system 100 is a mobile or an embedded device, the adapters 150 and network interfaces 160 support a variety of multi-modal interfaces including traditional keyboard and mouse interfaces, small text screens, pen, touch screens, speech recognition, text-to-speech and other emerging technologies like wearable devices. Such special-purpose devices for accessing the World Wide Web, such as an Internet access box for a television set, or a portable wireless web accessing device, which can implement an adapter for the purpose of communicating data to/from another computer system are also intended to be within the scope of a computer system 100.

As will be described in detail below, aspects of the preferred embodiment pertain to a specific method having steps implementable on a computer system 100. The computer system 100 is itself a further embodiment of the invention. An alternative embodiment implements the invention as a computer program-product for use with the computer system 100. The programs defining the functions of the preferred embodiment can be delivered to the computer system 100 and/or to the peripheral device for installation on a connected adapter via a variety of signal-bearing media, which include, but are not limited to: (a) information permanently stored on non-writable storage media, e.g., read only memory devices within either computer such as CD-ROM disks readable by CD-ROM; (b) alterable information stored on writable storage media, e.g., floppy disks within a diskette drive or a hard-disk drive; or (c) information conveyed to a computer by a telephone or a cable media network, including wireless communications. Such signal-bearing media, when carrying instructions that may be read by an adapter or a computer to direct the functions of the present invention, represent alternative embodiments.

In the case the software is written in the Java programming language, source code is submitted to a compiler. Java source code is compiled to generate bytecode. Typically, the compiler reads files with typically a ".java" extension; the generated bytecode is then saved in a file with typically a ".class" extension.

Figure 2:
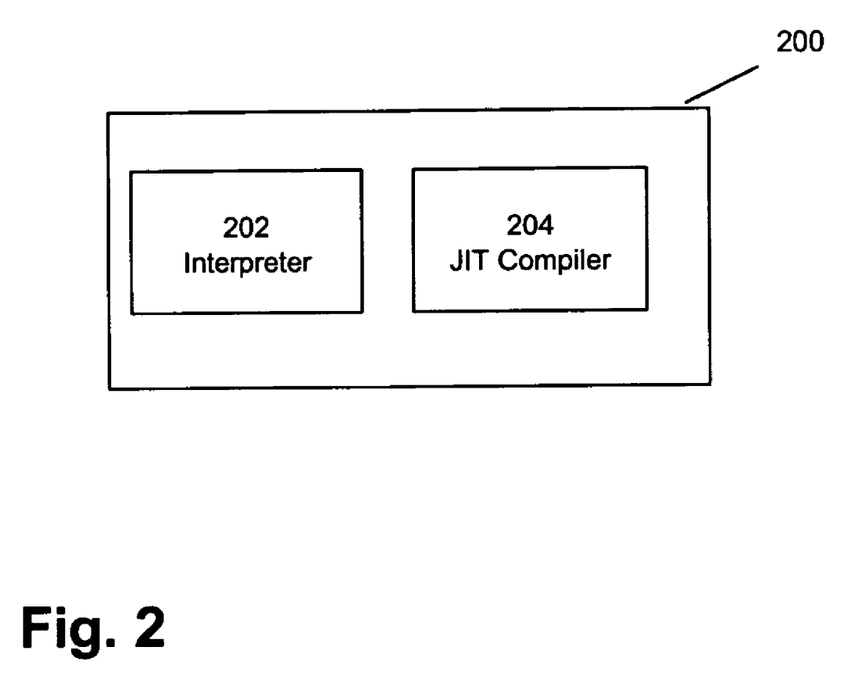
FIG. 2 depicts a block diagram showing the conceptual parts of a Java virtual machine in an exemplary embodiment of the present invention.

Depicted in FIG. 2 is a block diagram depicting the conceptual parts of a Java virtual machine 200 in an exemplary embodiment of the present invention. The Java virtual machine 200 comprises an interpreter 202, and a just-in-time compiler 204. Other possible components of the virtual machine 200 are not shown.

This invention is directed to method, computer program product and system for collecting arbitrary profiling data about the virtual machine 200 program execution, with the advantage of an interpreter 202 that is low overhead and memory efficient. Loose coupling is maintained between the interpreter 202 and the JIT compiler 204, separating the responsibility of each component. The interpreter 202 collects the data but the JIT compiler 204 maintains and uses the collected information to produce better optimized code.

In preferred embodiments of this invention, the interpreter 202 component maintains a buffer in each thread started by the application being executed for storing the profiling data. As would be understood to a person skilled in the art, the application thread runs as part of the interpreter 202 (thus in this document, the two terms are used interchangeably). The data in the buffer consists of a series of profiling records containing the program counter (PC) of the thread and profiling data. In preferred embodiments, profiling is only performed on selected types of bytecodes that result in information for compilation optimization. In other embodiments, this profiling is performed for every bytecode executed by the thread. The format of the profiling data is specific to the bytecode operation referred to by the PC. It should be clear to a person skilled in the art that any of a variety of encoding schemes could be used to store the data efficiently.

The following types of profiling data are typically collected and stored in the profiling records: (1) "branch taken" or "branch not taken" for conditional branches (e.g. ifeq, ifne, etc. . . . ); (2) the operand for multi-target branches (e.g. tableswitch or lookupswitch bytecodes); (3) the receiver class for virtual sends (e.g. invokevirtual); and (4) the operand class for cast bytecodes (e.g. instanceof, checkcast). It should be clear to anyone skilled in the art that a subset or a superset of this data could be collected depending on the requirements of the JIT compiler 204. For instance, information about the operands for divide bytecodes could also be collected.

In a preferred embodiment, the processing of a profiling buffer can be accomplished by its application thread running a method, typically part of the JIT compiler 204. When the JIT compiler 204 loads initially, it registers itself as a listener to a "buffer full" event. When the buffer is filled, the corresponding application thread posts the event and asks for an interested party to process the profiling data stored in the buffer. The application thread receives in return the function address inside the JIT compiler 204 that does the buffer processing. The application thread then calls that method, transferring control to it (the component of the compiler 204). The application resumes execution when the method terminates.

In an alternative embodiment, the application thread may have prior knowledge of the address of the JIT method which processes the profiling buffer (or have the code inlined altogether).

Furthermore, this invention includes the variation where one or more separate buffer processing threads are part of the interpreter 202, compiler 204, or any component of the virtual machine 200 to accept buffers indicated to by the application threads and then run the method for processing the buffers (either as part of the JIT or otherwise). An application thread waits for a continue signal from a buffer processing thread sent after the latter has completed processing a buffer (or after it has made a copy of the buffer for postponed processing).

Figure 4:
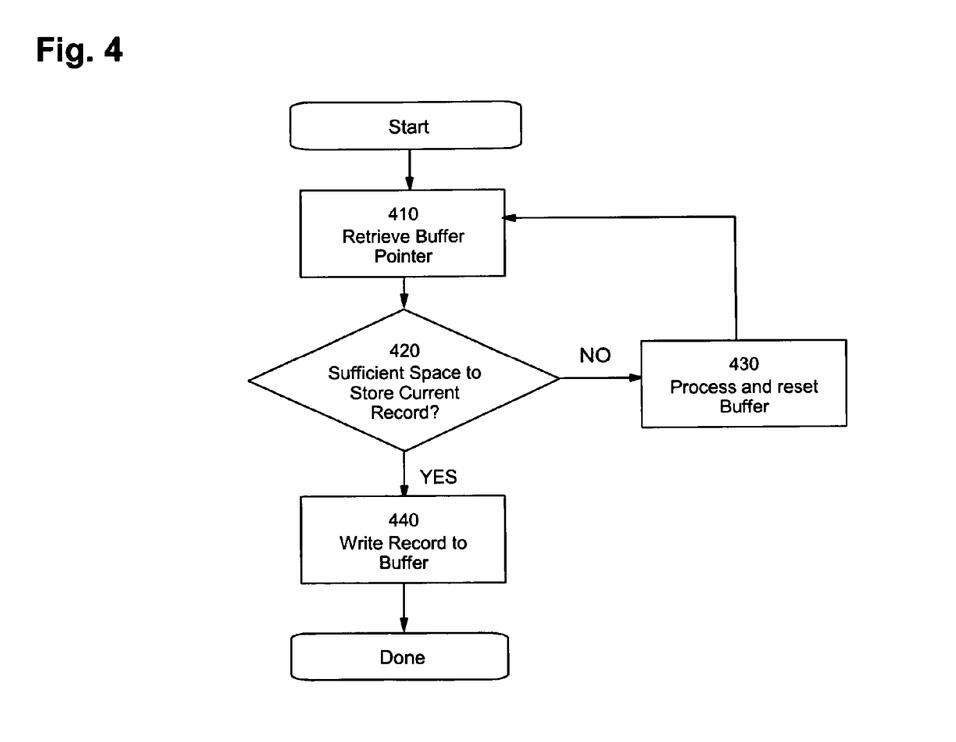
FIG. 4 is a flowchart of an exemplary process in accordance with a preferred embodiment of the present invention for populating the profiling buffer structure of each execution thread.

FIG. 4 indicates the steps of an exemplary process in accordance with a preferred embodiment of the present invention for the case where a program instruction that is subject to profiling is executed:

At step 410, the application thread retrieves the pointer to the profiling buffer structure from an application thread structure.

The application thread checks in step 420 that there is sufficient space available in the buffer to store the current record.

If there is insufficient space, the "buffer full event" is triggered and the JIT buffer processing method is invoked to process the buffer in step 430. The buffer processing method may make a copy of the buffer and then signal the application thread to continue execution using the original buffer while it processes the copy in parallel. In a variation, the interpreter 202 waits for the JIT compiler 204 to fully process the buffer before proceeding (by waiting on an event). The JIT compiler 204 method then parses the profiling records and storing the information in a space efficient format for later reuse when compiling the program code. The application thread goes on to retrieve the buffer pointer as Step 410.

If there is sufficient buffer space, the interpreter 202 writes the current program counter to the buffer followed by the corresponding profiling data for the given executing program element (step 440) and the interpreter 202 increments the buffer pointer to point to the next available slot, by adding the size of the bytecode PC pointer and the size of the profiling data to the buffer pointer.

Using per thread profiling buffers has several advantages over different kind of profiling approaches. Since the profiling is done on the application thread and the buffer data structures are allocated for each thread, writing data to the buffer does not require synchronization. The parsing process, on the JIT compiler 204 side, is only synchronized at the point when data is stored in the JIT internal structure.

With this buffered profiling approach, the process of collecting and storing the profiling data is completely independent of each other. The separation of the two processes solves the memory footprint issue, since the JIT compiler 204 decides when to discard the profiling data that was collected. For example, once a program segment is fully optimized the profiling data for that code can be disposed. The memory footprint overhead introduced by the interpreter 202 for each per thread buffer is typically constant.

Another advantage of collecting interpreter profiling data in per application thread buffers is that a trace of the application execution is contained in the buffer. Namely, since a profiling sample is taken for each executed call bytecode, while interpreting the code, call path information is automatically generated and available to the JIT compiler 204, which is of great value to method inlining compiler optimization. Given that call path information exists for a given group of methods, inlining optimization can make informed decisions which call sub-graphs to inline and how deep to inline.

Figure 3:
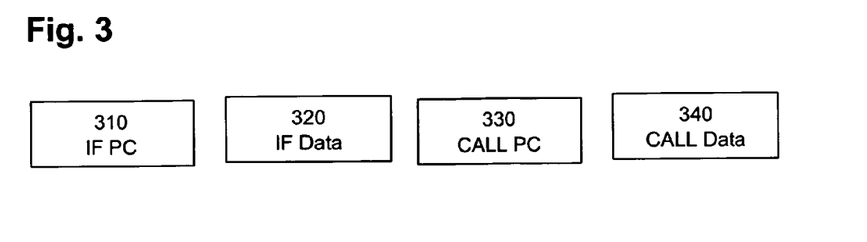
FIG. 3 illustrates a partial sample buffer structure in accordance with a preferred embodiment of the present invention.

The profiling buffer is compressed as much as possible so as to minimize the unnecessary overhead of processing too soon and of more data than needed. A profiling record structure with variable data field is preferably used. FIG. 3 shows a partial sample buffer structure in an exemplary embodiment on a 32-bit computer system 100. In the case of an "if" statement, the IF PC 310 of the bytecode is stored, followed by one byte of IF data 320 since it requires only a "Boolean" data type to represent the profiling information (one bit with 7 bits either unused or used for another purpose). For a "switch" statement, in the most common cases, the "switch" branches do not have more than 255 different branch targets; thus also only a single byte is needed. In the case of a call target, the full machine word size in the buffer is stored. For example on the 32-bit computer system of the exemplary embodiment, the CALL data 340 would be 4 bytes, stored after the CALL program counter 330.

Figure 5:
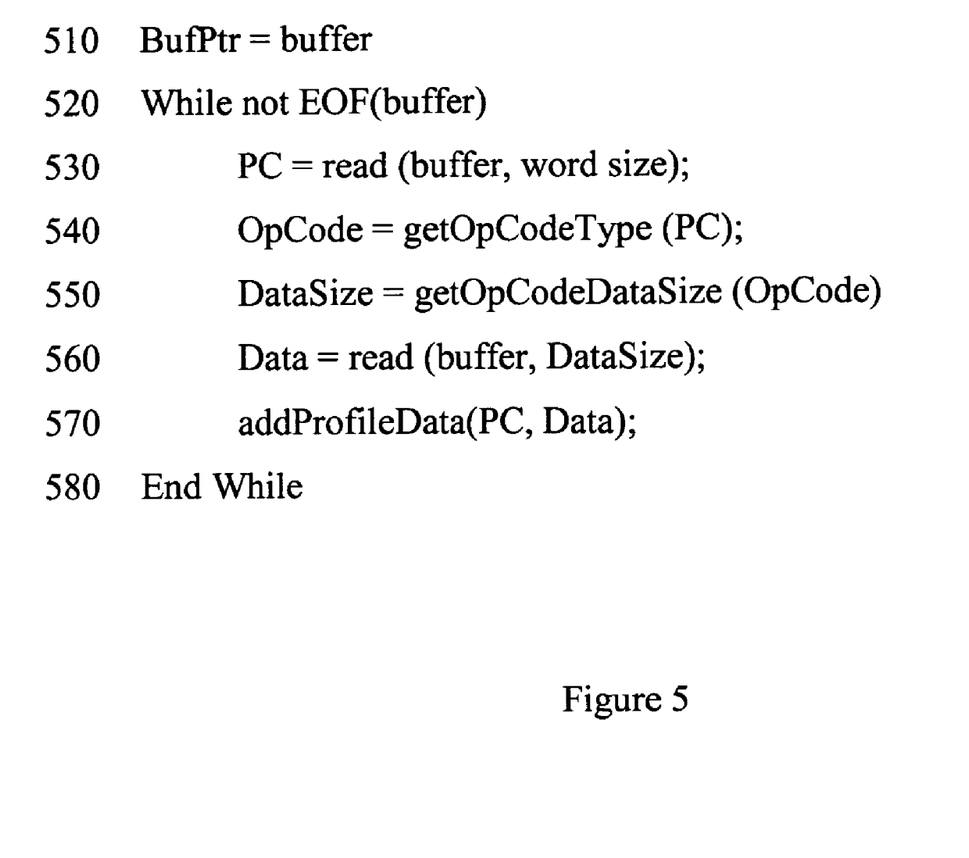
FIG. 5 is a sample pseudo-code for showing the steps of an exemplary process for how data population of persistent JIT profiling data might proceed.

Processing the profiling buffer by the compiler 204 (JIT method) further includes storing the information in internal JIT format. A hash table is preferably used, in which the internal JIT structures are stored. The hash table key may be a function of the value of the program counter (PC) memory address. FIG. 5 presents an example of how this data population of persistent JIT profiling data may proceed using pseudo-code to represent the steps of a loop executed by the JIT method.

In order to process the data, a temporary pointer (indicated as BufPtr) is used, which is initially set to the start of the buffer, in Step 510.

Loop execution is controlled in Step 520 by the EOF (End Of File) function, which returns true if BufPtr points to the end of the buffer.

In Step 530 the program counter (PC) of the bytecode that was profiled is read, which per the profiling data structure has size of typically one word. Using the program counter address, which is unique for the program code, the exact operation that was performed while the program was profiled can be identified. The read function does a memory read of the current word pointed to by BufPtr and increments BufPtr by the size read.

In Step 540 the function getOpCodeType is used to retrieve the operation type of the bytecode (instruction) at the given program counter.

Based on the operation type of the current bytecode, the size of the next profiling data record which should be read is determined by calling the function getOpCodeDataSize in Step 550.

In Step 560 the profiling data is read, given the size of the profiling data record obtained in step 550. The second call to read also increments BufPtr by the size of the profiling data record.

The addProfileData function of step 570 does preferably an atomic insert into a hash table to store the profiling data. This atomic update means that new records are created using a lock operation to avoid duplicate hash table entries for a given PC. This makes the hash table data structure more consistent, although if duplicate entries existed it wouldn't be a functional problem, because once added the first one on the list is always located. If previous profiling data for the given PC exists, the new information is handled based on the operation code. For example, if the operation code is "if" branch statement, the branch counters (taken and not-taken) are incremented.

Step 580 completes the loop for buffer data processing.

The compiler 204 can compile code using a compilation component at the same time as it (more specifically a profile processing method being part of a runtime component of the compiler 204) processes multiple profiling buffers.

When storing the information in the internal JIT structures, the JIT compiler 204 uses an efficient storage format which represents a compromise between completeness of information and minimal space overhead. For example, in order to decrease the memory footprint the JIT compiler 204 may choose to represent the "if" statement taken and not-taken counts using a single byte. The "if" statement single byte representation uses the upper 4 bits of the byte for storing the taken count and the lower 4 bits for the not-taken count.

During compilation of a method, the JIT compiler 204 queries the profiling data on-demand. For example, when the compiler 204 is about to make a decision how to layout the code given an "if" statement, the compiler 204 queries the profiling data for that program counter. If profiling data for the PC exists in the hash table, the profiling framework returns the branch taken and not-taken counts so that the compiler 204 can make an optimal decision how to lay out the code.

Additional support may also be required to support code unloading. If a class is unloaded (e.g. in Java, a class will be unloaded once there are no references to its ClassLoader object), the JIT compiler 204 must discard any data in its hash table, and any profiling data related to that class must be removed from any per thread buffers. One may simply reset all per thread buffers when a class is unloaded.

Collecting profiling data for every bytecode executed can significantly impact the performance of the interpreter 202, and can introduce significant storage overhead. During application start-up the interpreter 202 collects valuable data which will aid in JIT optimization. However, once JIT optimization has taken place, the interpreter 202 is used for cold methods, for methods which cannot be compiled, and for methods which have been compiled but have not yet transitioned to the compiled version. Profiling information for these methods is of little value.

The overhead of profiling can be controlled by the introduction of a simple modification to the solution described above. Instead of profiling every bytecode executed, profiling may be selectively turned on and off.

The interpreter 202 maintains preferably a table of pointers called the 'bytecode table' which contains a pointer to an implementation for each bytecode which the interpreter 202 understands. The interpreter 202 includes two implementations for each bytecode which may be profiled: one implementation which collects profiling data and one which does not. When bytecode profiling is enabled, the bytecode table is modified to point to the profiling implementation of the bytecodes. When it is disabled, the table is modified to point to the non-profiling implementation of the bytecodes. This allows the interpreter 202 to execute at full speed when bytecode profiling is turned off.

In general, JIT compilers 204 already include a controller thread which samples the current application execution PC at well defined intervals (to identify hot methods). The controller thread is modified to periodically check whether bytecode profiling should be on or off, and to enable or disable bytecode profiling if the state changes.

The proposed algorithm for selective interpreter 202 profiling is as follows:

(1) Initially the application starts typically with interpreter 202 collecting profiling data (profiling data collection ON).

(2) The controller threads takes samples on well defined time intervals and measures the ratio of samples taken in JIT compiled code versus samples taken in the interpreter 202 component of the VM. If the computed ratio grows beyond certain number, the controller thread turns OFF the interpreter 202 data collection. The ratio is computed periodically after defined number of samples, which is based on the current sampling frequency.

(3) If the application changes its run-time behaviour, that is, new classes get loaded and the activity of the interpreter 202 grows again, the controller thread turns on again the interpreter 202 data collection.

The virtual machine 200 may be implemented either in software or in hardware (as a virtual machine chip).

While the present invention has been described in the context of a data processing system or method/process, those of ordinary skill in the art will appreciate that the present invention can also be worked in the form of a computer program product comprising computer readable medium of computer readable instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted embodiment is directed towards processing bytecodes in Java, the processes of the present invention may be applied to other programming languages and environments that process instructions, which are nonspecific to a computer on which the instructions are to be executed. In such a case, a virtual machine 200 on the computer may interpret the instructions or send the instructions to a compiler to generate code suitable for execution by the computer on which the virtual machine 200 is located. Furthermore, the inventive concept includes the reduction of any optimizing step for software execution, in addition to those for just-in-time compilation, performed during class loading phase. Once class loading phase is detected, these optimizing steps may be reduced in frequency or intensity depending on the circumstances.

The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for collecting profiling information during runtime of a multithreaded program, the method comprising the steps of:
    receiving a plurality of instructions of the program for execution in an application thread;
    identifying by an interpreter within a virtual machine whether profiling is enabled for the plurality of instructions within a bytecode table, wherein for each of the plurality of instructions, the bytecode table points to one of a first implementation that collects profiling records and a second implementation that does not collect profiling records;
    responsive to the bytecode table pointing to the first implementation, storing by the interpreter within the virtual machine a plurality of profiling records in a buffer assigned exclusively to the application thread during execution of the plurality of instructions, wherein at least one of the plurality of profiling records is a branch statement count, the branch statement count being a single byte, wherein each profiling record is of a variable size; and
    processing using a compiler within the virtual machine the plurality of profiling records in the buffer.

2. The method of claim 1, wherein one profiling record is stored in the buffer for each of the plurality of instructions.

3. The method of claim 1, wherein the application thread posts a buffer full event when the buffer is filled with the plurality of profiling records, the buffer full event being listened for by the compiler for commencing processing the buffer.

4. The method of claim 1, wherein the application thread is one of a plurality of execution threads and the compiler runs in a separate thread.

5. The method of claim 1, wherein the step of processing the buffer comprises the step of reproducing a copy of the buffer.

6. The method of claim 1, wherein the step of processing the buffer comprises resetting the buffer for the application thread to insert additional profiling records into the buffer.

7. The method of claim 1, wherein:
    each instruction is a Java bytecode; and
    each profiling record comprises a first record field containing a program counter and a second record field containing profiling data, and the second record field being of a variable size.

8. The method of claim 7, wherein the step of processing the buffer comprises storing for each profiling record its corresponding profiling data in a hash table using its corresponding program counter as a hash key.

9. The method of claim 7, wherein the profiling data of each profiling record comprises operand data selected from the group consisting of: an indicator for "branch taken" or "branch not taken" for conditional branches; an operand for multi-target branches; a receiver class for virtual sends; and an operand class for cast bytecodes.

10. A computer system for collecting profiling information during runtime of a multithreaded program, the system comprising:
    a memory having computer usable instructions stored thereon;
    a processor, wherein the processor executes the computer usable instructions:

to receive a plurality of instructions of the program for execution in a thread;

to identify, by an interpreter within a virtual machine, whether profiling is enabled for the plurality of instructions within a bytecode table, wherein for each of the plurality of instructions, the bytecode table points to one of a first implementation that collects profiling records and a second implementation that does not collect profiling records;

to store, by the interpreter within the virtual machine, a plurality of variable size profiling records in a buffer assigned exclusively to the thread during execution of the plurality of instructions, wherein the storing is responsive to the bytecode table pointing to the first implementation, and wherein at least one of the plurality of profiling records is a branch statement count, the branch statement count being a single byte, wherein each profiling record is of a variable size; and to process the plurality of profiling records in the buffer using a compiler within the virtual machine.

11. The system of claim 10, wherein one profiling record is stored in the buffer for each of the plurality of instructions.

12. The system of claim 11, wherein the thread posts a buffer full event when the buffer is filled with the plurality of profiling records, the buffer full event being listened for by the compiler for commencing processing the buffer.

13. The system of claim 11, wherein the thread is one of a plurality of execution threads and the compiler runs in a separate thread.

14. The system of claim 11, wherein:

each instruction is a Java bytecode; and each profiling record comprises a first record field containing a program counter and a second record field containing profiling data, and the second record field being of a variable size.

15. The system of claim 14, wherein the processor executing the computer usable program code to process the plurality of profiling records further comprises the processor executing the computer usable program code to store each profiling record its corresponding profiling data in a hash table using its corresponding program counter as a hash key.

16. A recordable type medium having a computer program product encoded thereon for collecting profiling information during runtime of a multithreaded program, the computer readable medium having comprising:

instructions for receiving a plurality of instructions of the program for execution in a thread;

instructions for identifying by an interpreter within a virtual machine whether profiling is enabled for the plurality of instructions within a bytecode table, wherein for each of the plurality of instructions, the bytecode table points to one of a first implementation that collects profiling records and a second implementation that does not collect profiling records:

instructions for storing by the interpreter within the virtual machine a plurality of variable size profiling records in a buffer assigned exclusively to the thread during execution of the plurality of instructions, wherein the storing is responsive to the bytecode table pointing to the first implementation, and wherein at least one of the plurality of profiling records is a branch statement count, the branch statement count being a single byte, wherein each profiling record is of a variable size; and instructions for processing the plurality of profiling records in the buffer using a compiler within the virtual machine;

wherein one profiling record is stored in the buffer for each of the plurality of instructions.

17. The recordable type medium of claim 16, wherein the processing code means comprises resetting code means for resetting the buffer for the application thread to insert additional profiling records into the buffer.

18. The recordable type medium of claim 16, wherein:

each instruction is a Java bytecode; and each profiling record comprises a first record field containing a program counter and a second record field containing profiling data, and the second record field being of a variable size.

19. The recordable type of claim 18, wherein the instructions for processing the plurality of profiling records comprises instructions for storing each profiling record its corresponding profiling data in a hash table using its corresponding program counter as a hash key.

* * * * *